United States Patent [19]

Hackforth et al.

[11] 4,347,716
[45] Sep. 7, 1982

[54] FLEXIBLE SHAFT COUPLING

[75] Inventors: Josef Hackforth; Jürgen Walter, both of Herne, Fed. Rep. of Germany

[73] Assignee: Hackforth GmbH & Co., KG, Herne, Fed. Rep. of Germany

[21] Appl. No.: 187,740

[22] Filed: Sep. 16, 1980

Related U.S. Application Data

[62] Division of Ser. No. 927,958, Jul. 26, 1978, Pat. No. 4,277,958.

[30] Foreign Application Priority Data

Jul. 29, 1977 [DE] Fed. Rep. of Germany ....... 2834279

[51] Int. Cl.³ .............................................. F16D 3/17
[52] U.S. Cl. .................................................... 464/83
[58] Field of Search ............... 64/11 R, 12, 27NM, 19

[56] References Cited

U.S. PATENT DOCUMENTS

| | | | |
|---|---|---|---|
| 1,788,741 | 1/1931 | Reedy | 64/10 |
| 2,816,424 | 12/1957 | Vorthmann | 64/11 R |
| 2,893,223 | 7/1959 | Schlotmann et al. | 64/11 R |
| 3,906,745 | 9/1975 | Faust | 64/11 R |
| 4,031,714 | 6/1977 | Faust | 64/11 R |
| 4,067,207 | 1/1978 | Bohm et al. | 64/11 R |

Primary Examiner—Ira S. Lazarus
Assistant Examiner—Magdalen Moy
Attorney, Agent, or Firm—Toren, McGeady & Stanger

[57] ABSTRACT

A flexible shaft coupling is of the kind comprising two annular assemblies which transmit torque between two rigid coupling parts which are arranged concentrically one within the other. The annular assemblies are concentric and have a space between them, and groups of radially directed filament loops or turns, which are embedded in an elastomeric mass, extend around members of the assemblies to interconnect the assemblies. Parts of the loops or turns between the members are supported on elastic cushions, which are formed by parts of the elastomeric masses, and are displaceable inwards into gaps between the members and within the elastomeric masses. The members of one assembly are attached to one coupling part and the members of the other assembly are attached to the other coupling parts. In order to ensure that in service, the filament loops or turns and the elastomeric masses in which they are embedded remain stressed in tension, in spite of fluctuations in the torque transmitted, the groups of filament loops or turns in their masses of elastomeric material are mounted so that they can pivot relative to the rigid coupling parts about axes which are parallel to the common axis of the coupling parts.

4 Claims, 8 Drawing Figures

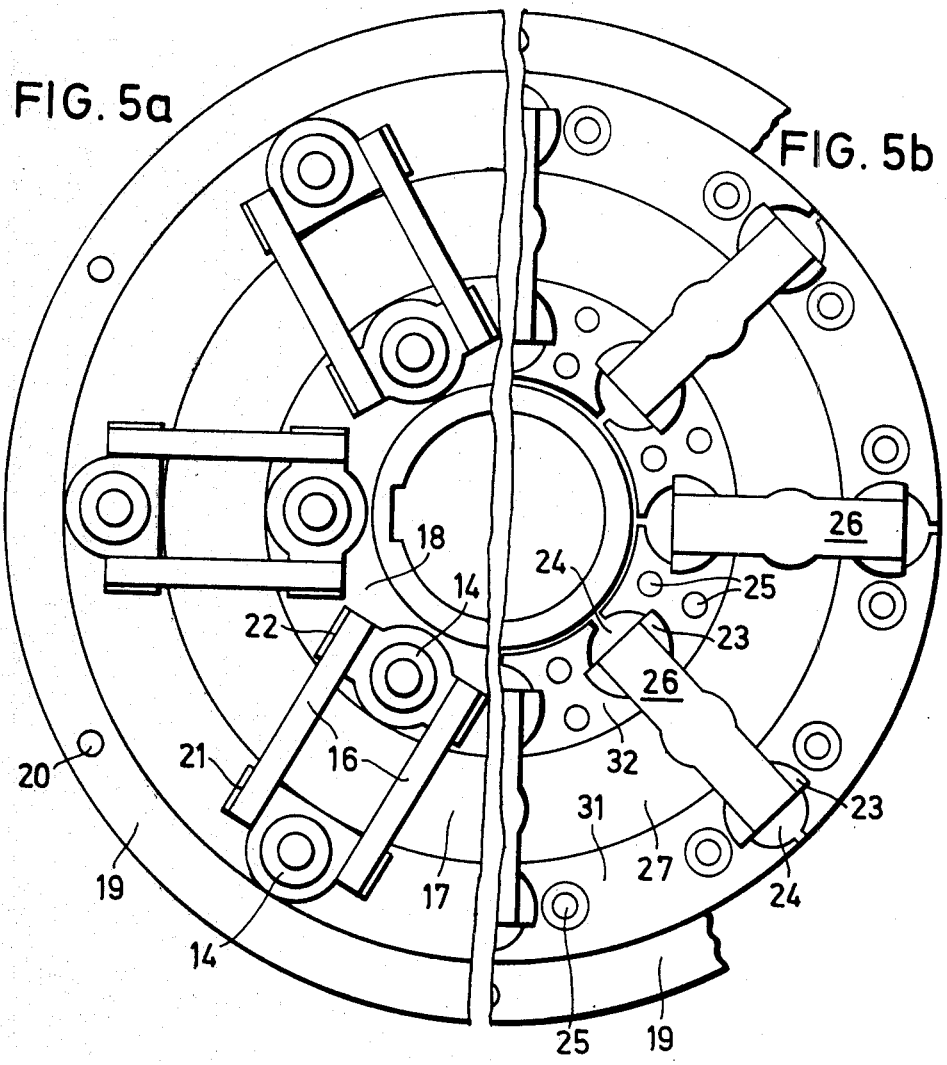
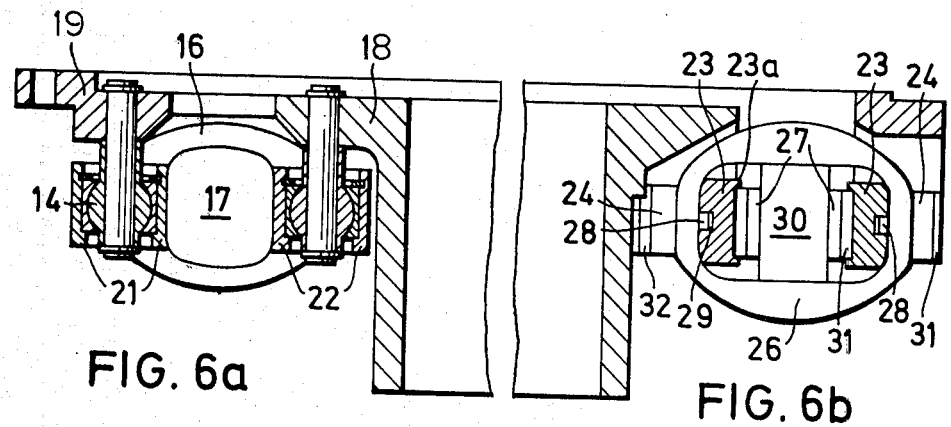

FLEXIBLE SHAFT COUPLING

This is a division of application Ser. No. 927,958 filed July 26, 1978, and now U.S. Pat. No. 4,277,958.

The invention refers to a flexible shaft coupling comprising two annular assemblies which transmit torque between two rigid coupling parts which are arranged concentrically one within the other, the annular assemblies being concentric with a space between them, and groups of radially directed filament loops or turns embedded in an elastomeric mass, the loops or turns extending around members of the assemblies to interconnect the assemblies, parts of the loops or turns between the members being supported on elastic cushions which are displaceable inwards into gaps between the members and within the elastomeric masses, the members of one assembly being attached to one coupling part and the members of the other assembly being attached to the other coupling part.

In one such coupling which is described in German Pat. No. 2,251,236 certain disadvantages occur in service owing to the fact that when the rigid coupling parts twist relative to each other, the filament loops or turns are not stressed over the whole of their peripheries in tension but are partially stressed, mainly in the regions where the loops pass round the members, in compression and bending. Because of this, relative movements occur between adjacent filaments and between the filaments and their surrounding elastomeric masses. These relative movements in turn lead after a fairly long working life to local separations between these parts which are initially bonded together by vulcanisation. They also lead to friction between the separated parts and hence to the undesirable development of heat as well as to premature wearing out of the flexible parts. These disadvantages become the more noticeable, the greater the torque transmitted by the coupling and the more frequently to the stresses on the flexible parts change.

The object of the present invention is to improve the couplings of the kind described above in such a way that the filament loops or turns and the elastomeric masses are, during service of the coupling, as far as possible loaded only in tension and hence all of the disadvantages arising from other loadings are avoided or lessened.

To this end, according to this invention, in a flexible shaft coupling of the kind described above, the groups of filament loops or turns in their masses of elastomeric material are mounted so that they can pivot relative to the rigid coupling parts about axes which are parallel to the common axis of the coupling parts.

Because of this mounting, the groups of loops or turns with the masses enveloping them are twisted as a whole relative to the coupling parts under the influence of the torque being transmitted by the coupling and the loops are thus aligned along the direction of tension, that is, they are loaded still substantially only in tension. Changes in torque have the effect only of producing oscillations in tension, whilst the pendulum movements resulting from the change in torque act only upon the pivotal mountings which can be constructed to withstand the movements without undue wear or tear. Filament loops or turns mounted so that they can pivot in the manner described, also yield considerably more easily to alterations in the torque that can be done by filament loop-reinforced elastomeric parts the ends of which are fixed immovably in ring sectors connected rigidly to the rigid coupling parts. Couplings in accordance with the invention can consequently easily display high initial flexibility and a high degree of progressive resistance to deflection under torque. Because of this the couplings follow more rapidly the introduced and increased torque and the restoring forces of the previously elastically deformed elastomeric parts.

Further possibilities arising from the pivotal mounting of the filaments and the elastomeric masses, of improvement in these parts in themselves as well as in respect of their arrangement, operation and loading, and also of the simplified production of the members of the assemblies will be discussed in the description below of examples of couplings in accordance with the invention.

Three examples of couplings in accordance with the invention will now be described with reference to the accompanying drawings, in which.

FIGS. 5a and 5b each show in elevation one half of each of two further examples of couplings; and, FIGS. 6a and 6b are axial sections through the couplings shown in FIGS. 5a and 5b.

Figure 1:
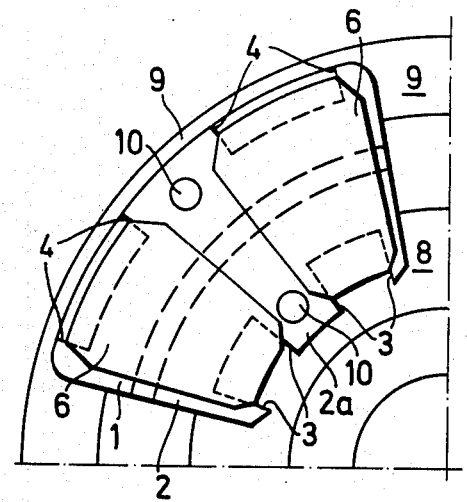
FIG. 1 is an elevation looking in an axial direction of a right-angled sector of one example.
Figure 2:
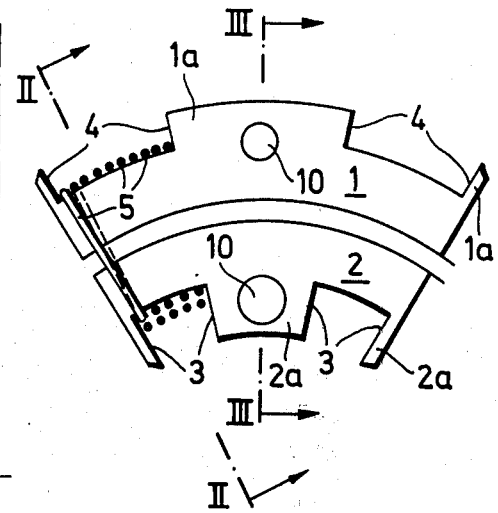
FIG. 2 is an elevation of two sector shaped members forming part of the example of FIG. 1, with a filament winding connecting the members shown in section.

In the example shown in FIGS. 1 to 4 and as may be seen particularly clearly from FIGS. 1 and 2, two members in the form of concentric sectors 1 and 2 bounded by the same axially extending radial plane and lying one radially within the other with a space between them, are connected by two groups of filament loops or turns 5 of which in FIG. 2 only one group is illustrated. The sectors 1 and 2 are provided at their circumferential edges with radially extending projections 1a, 2a lying in the same radial planes. Faces 3 and 4 of these projections secure the groups 5 of filament loops against movement circumferentially of the sectors.

Figure 4:
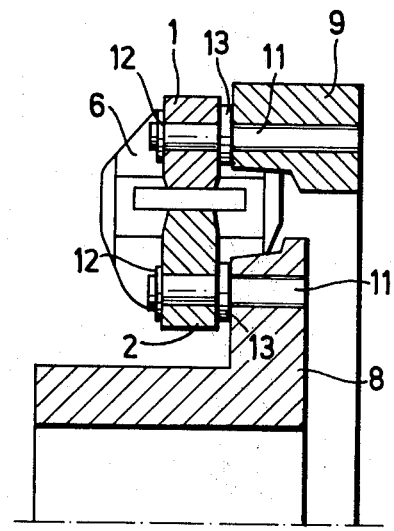
FIG. 4 is a section similar to FIG. 3, but as seen along the line III—III in FIG. 2.

The sectors 1 and 2 are each provided with a bore 10 lying on a central axially extending radial plane. These bores are used for receiving bearings by which the sectors 1 and 2 are mounted so that they can swing about axially parallel bearing bolts 11 extending from rigid coupling parts 8 and 9 of the coupling (FIG. 4). Spacer rings 13 ensure the necessary spacing of the sectors 1 and 2 from the rigid coupling parts 8 and 9.

Figure 3:
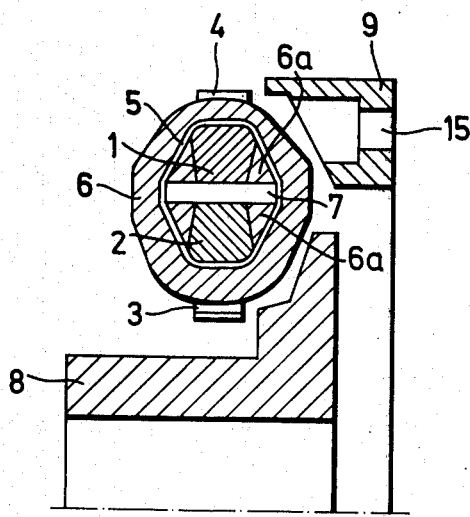
FIG. 3 is a section on an axially extending radial plane through one half of the coupling of FIGS. 1 and 2, as seen along the line II—II in FIG. 2.

As may be seen from FIGS. 3 and 4 the groups 5 of filaments together with the parts of the sectors 1 and 2 enveloped by them are embedded in a rubber mass 6. The rubber mass 6 together with the annular gap 7 between the sectors 1 and 2 forms a central cavity open at its ends. This serves for the ventilation and cooling of the rubber parts as well as forming a space for the displacement of parts 6a of the rubber mass included between the sectors 1 and 2 and the filament loops 5 which are arched axially outwards.

Instead of the simple mounting of the ring sectors 1 and 2, shown in FIGS. 1 to 4, the sectors may be supported on the ends of the bolts 11 by sliding bearings and they may be secured against sliding off the bolts 11 by circlips 12. Alternatively roller bearings may be provided or as in the example of FIG. 6a the sectors may be supported by ball-head bearings 14. Ball-head bearings or roller bearings made as swivel bearings facilitate the adaptation of the flexible coupling parts to alterations in length and angular adjustments between the shafts coupled by the coupling and prevent transverse loadings of the flexible coupling parts in axial directions, which are otherwise thereby caused.

In the example illustrated in FIGS. 1 to 4, because of the radial arrangement of the flexible parts formed by the filaments 5 and rubber masses 6, transverse loadings of these parts are largely but not completely avoided. When the coupling is in service slight transverse loadings still result from the tension which occurs if the flexible parts get stretched and their filament loops get slightly twisted out of their normal position.

Even these small residual transverse loadings are avoided in the examples of the coupling shown in FIGS. 5a and 5b of the drawings.

In the example shown in FIG. 5a the flexible coupling parts arranged between rigid coupling parts 18, 19 consist of straight sectors 21 and 22 and rubber parts 16 each reinforced by a group of loops connecting the sectors. The straight sectors 21 and 22 allow the rubber parts as well as the filaments of the two filament groups to be arranged parallel to planes extending through the centers of the sectors and hence parallel to one another.

Thus, when the coupling is in service, the rubber parts and the filament loops embedded in them loaded exclusively in tension and the parts of the rubber masses (FIG. 3) which support the filament loops on the ring sectors are loaded merely in compression.

The straight ring sectors 21, 22 furthermore allow the filament loops to be arranged in layers of equal width along the length of the sectors. The winding of the groups of loops is thereby considerably facilitated. Depending upon the diameter of the coupling and the magnitude of torque to be transmitted, the straight sectors may be parts of polygonal flat rings of any number of sides.

Axial bores 15 or 20 through the outer rigid coupling rings 9 or 19 (see FIGS. 3 and 5a respectively) are used for fastening these rings to a second hub part (not shown).

A further simplification in the production and in the maintenance of the flexible coupling parts results if the groups of filament loops embedded in their rubber masses are not suspended as in the example of FIG. 5a in pairs from sectors to which they are connected by vulcanising, but if instead each group of loops embedded in its rubber mass is mounted individually and pivotally on sectors which are resistant to bending. These sectors are then connected rigidly to the rigid coupling parts and serve to support the groups of loops as well as for the receiving and transmission of the torque.

Such an example is illustrated in FIGS. 5b and 6b. In this example, groups 26 of loops embedded in a rubber mass are recessed in grooves round the end faces and a surface part, flattened between the end faces, of part cylinders 23 which are guided by their complete surface parts to slide on cylindrical bearing surfaces of recesses 24 in the sectors 31 and 32 of divided flat rings. The sectors 31 and 32 are fixed immovably by means of bolts 25 to the rigid coupling parts 18 and 19 respectively.

Cylindrical bearing surfaces for the part cylinders 23 are formed, for simplification of production and assembly, by the walls of semi-cylindrical recesses 24 in the adjacent ends of the sectors 31, 32. In these recesses which complete hollow cylinders, the part cylinders 23 are secured against axial shifting by flanges 23a surrounding their projecting ends.

Where the groups 26 of loops are not connected in a vulcanising operation to the part cylinder 23 but are produced separately, the groups of loops 26 are provided with internal projections 28 which engage in recesses 29 in the surfaces of the part cylinder 23 which are covered by them.

Since the end faces of the part cylinder 23 surrounded by the groups of loops form only small areas against which the groups 26 of loops can bear through parts of a rubber mass enveloping them, the parts of each group 26 of loops covering the annular gap 27 between the sectors 31 and 32 are arched outwards towards one another by resilient bodies 30 arranged between them and supported against one another.

The resilient bodies 30 preferably consist of elastomeric material and may then be parts of the rubber mass enveloping the filament loops. They may alternatively be metal springs or combinations of springs, e.g. shock absorbers. The choice and the construction of the resilient bodies 30 follows from the requirements which are imposed upon the line of separation at the coupling as well as upon the elasticity and upon the damping value of the coupling.

Resilient bodies 30 may also be provided inside the rubber parts 16 of loops as well as or instead of, cushions supporting these groups of loops from the sectors 21, 22.

We claim:

1. In a flexible shaft coupling comprising first and second rigid coupling parts arranged concentrically one within the other, first and second annular assemblies, means attaching said first annular assembly to said first coupling part, and means attaching said second annular assembly to said second coupling part, said annular assemblies being concentric with a space between them and each of said annular assemblies including a plurality of members, and transmission means interconnecting said members to transmit torque between said rigid coupling parts, said transmission means including a plurality of elastomeric masses and a plurality of groups of radially directed filament loops, each of said groups being embedded in one of said masses and extending round one of said members in said first annular assembly and round one of said members in said second annular assembly to interconnect said assemblies, said loops including parts between said members and elastic cushion means supporting said parts for displacement inwards into gaps between said members and within said elastomeric members, the improvement comprising means pivotally mounting each of said groups and each of said masses of elastomeric material whereby said groups and said masses can pivot relative to said rigid coupling parts about axes which are parallel to a common axis of said coupling parts, each of said members includes means defining a groove therein, and further comprising a part cylinder in each of said grooves, means defining a cylindrical bearing surface in said groove, and means slidably mounting said part cylinder on said cylindrical bearing surface, said group of loops extending around said part cylinder in said groove whereby said loops can pivot relative to said members about axes relative to said central axis.

2. A shaft coupling as claimed in claim 1, further comprising means defining semi-cylindrical recesses in adjacent ends of said members, said cylindrical bearing surfaces being defined by walls of said recesses, and flanges surrounding ends of said part cylinders, said flanges securing said part cylinders in said recesses against movement in the axial direction of said coupling parts.

3. A shaft coupling as claimed in claim 2, further comprising internal projections on said groups of loops and means defining recesses in said part cylinders, said internal projections engaging one in each of said recesses to locate said loops relative to said part cylinders.

4. A shaft coupling as claimed in claim 3, wherein said groups of loops include parts extending between said part cylinders, and further comprising resilient bodies extending between said parts of said groups of loops to hold said loops outwardly arched.

* * * * *

UNITED STATES PATENT OFFICE
CERTIFICATE OF CORRECTION

Patent No. 4,347,716  Dated September 7, 1982

Inventor(s) Josef Hackforth et al

It is certified that error appears in the above-identified patent and that said Letters Patent are hereby corrected as shown below:

On the title page, Foreign Application Priority Data should read:

-- [30] Foreign Application Priority Data

July 29, 1977 Fed. Rep. of Germany   2734279 --

Signed and Sealed this

Ninth Day of November 1982

|SEAL|

Attest:

Attesting Officer

GERALD J. MOSSINGHOFF

Commissioner of Patents and Trademarks